United States Patent [19]

Ichimura

[11] Patent Number: 5,763,351
[45] Date of Patent: Jun. 9, 1998

[54] FLUID FUEL REFORMING CERAMIC CATALYSTS AND THEIR MANUFACTURING METHODS

[75] Inventor: Shoji Ichimura, Iwata-gun, Japan

[73] Assignee: Fukuyo Ichimura, Shizuoka, Japan

[21] Appl. No.: 798,493

[22] Filed: Feb. 10, 1997

[51] Int. Cl.⁶ .............. B01J 23/00; B01J 26/56; B01J 21/04; B32B 5/16
[52] U.S. Cl. .............. 502/303; 502/302; 502/331; 502/332; 502/334; 502/439; 502/527; 428/403; 428/404; 428/570
[58] Field of Search .............. 502/302, 303, 502/331, 332, 334, 439, 527; 428/403, 404, 570

[56] References Cited

U.S. PATENT DOCUMENTS

| | | | |
|---|---|---|---|
| 3,145,183 | 8/1964 | Fisher | 502/439 |
| 3,259,589 | 7/1966 | Michalko | 502/334 |
| 3,839,225 | 10/1974 | Acres | 502/177 |
| 3,951,860 | 4/1976 | Acres et al. | 502/207 |
| 4,804,796 | 2/1989 | Wang et al. | 428/404 |
| 4,975,406 | 12/1990 | Frestad et al. | 502/302 |
| 5,256,616 | 10/1993 | Heller et al. | 428/404 |
| 5,424,129 | 6/1995 | Lewis et al. | 428/404 |
| 5,496,674 | 3/1996 | Adel et al. | 428/404 |

*Primary Examiner*—Walter D. Griffin
*Assistant Examiner*—Patricia L. Hailey
*Attorney, Agent, or Firm*—Burgess, Ryan & Wayne

[57] ABSTRACT

A fluid fuel reforming ceramic catalyst comprising a core 2 of a complex oxide ceramic of transition metals, an intermediate layer 3 of an alumina-based silicate ceramic covering the core 2 and an outer layer 4 of a ceramic containing noble metals prepared by forming the core by firing the complex oxide ceramic of transition metals, coating the intermediate layer of the alumina-based silicate ceramic over the core, and coating the outer layer of the ceramic containing noble metals over the intermediate layer increases the octane number of fluid fuels, enhances their combustion efficiency, and decreases the noxious substances in exhaust gases.

13 Claims, 8 Drawing Sheets

BEFORE CATALYST IMMERSION

ABSTRACT

FLUID FUEL REFORMING CERAMIC CATALYSTS AND THEIR MANUFACTURING METHODS

BACKGROUND OF THE INVENTION

This invention relates to fluid fuel reforming ceramic catalysts that effectively increase combustion efficiency and decrease obnoxious substances in gasoline, light oil and other liquid fuels and natural gas and other gaseous fuels by reforming them.

Gasoline, for example, contains approximately 30 percent of benzene, acetaldehyde and other incombustible and environment polluting substances and approximately 10 percent of octane-number increasing substances, anti-freezing agent and other additives, in addition to approximately 60 percent of combustible substances. The incombustible and environment polluting substances are discharged as obnoxious substances in exhaust gases as a result of incomplete combustion. Reforming these incombustible and environment polluting substances into combustible substances will increase the ratio of combustible substances that are conducive to efficient combustion. To burn the reformed substances, however, oxygen supply (or air supply) must be increased. However, larger quantities of air inevitably contains greater amounts of nitrogen. Then, the content of nitrogen oxides in exhaust gases inevitably increases. Although some air is dissolved in fuels, not all of the oxygen contained in the dissolved air contributes to combustion reactions. If the dissolved oxygen not contributing to combustion reactions is activated, then the additional combustible substances obtained by reforming incombustible and environment polluting substances can be efficiently burned without increasing the amount of air supply from the outside.

Thus, the object of this invention is to provide catalysts that reform incombustible and environment polluting substances contained in fluid fuels to combustible substances and increase combustion efficiency and decrease the content of obnoxious substances in exhaust gases by activating the oxygen in the air dissolved in fuels and methods for manufacturing such catalysts.

SUMMARY OF THE INVENTION

To solve the above problem, this invention provides:

(1) fluid fuel reforming ceramic catalysts comprising a core of a complex oxide ceramic of transition metals, an intermediate layer of an alumina-based silicate ceramic covering the core, and an outer layer of a ceramic containing a noble metal alloy covering the intermediate layer; and (2) a method for manufacturing fluid fuel reforming ceramic catalysts comprising the steps of coating an alumina-based silicate ceramic as an intermediate layer covering a core of a complex oxide ceramic of transition metals and coating a ceramic containing a noble metal alloy as an outer layer.

DETAILED DESCRIPTION OF THE INVENTION

Figure 1:
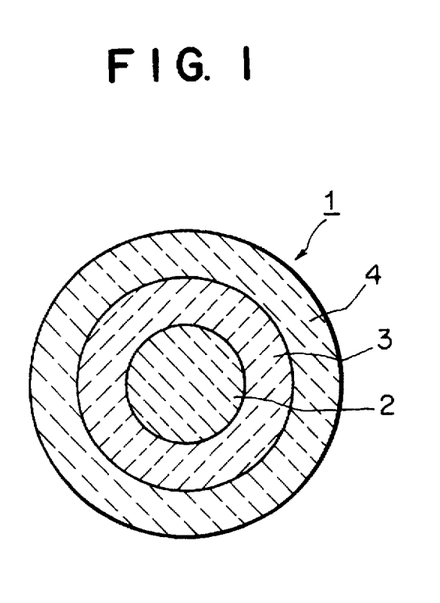
FIG. 1 is a cross-sectional view schematically illustrating the structure of a ceramic catalyst according to this invention.

The following paragraphs describe the fluid fuel reforming ceramic catalysts according to this invention. FIG. 1 is a cross-sectional view schematically illustrating the structure of a fluid fuel reforming ceramic catalyst according to this invention. A fluid fuel reforming ceramic catalyst 1 basically has a three-layer structure comprising a core 2 of a complex oxide ceramic of transition metals, an intermediate layer 3 of a silicate ceramic consisting essentially of alumina (i.e., alumina-based) covering the core 2, and an outer layer 4 of a ceramic containing a noble metal alloy covering the intermediate layer 3.

The outer and intermediate layers 4 and 3 are of porous materials having pores that allow the passage of gases and liquids to and from the outside. The core 2 is also porous, though the porosity is greater than in the intermediate and outer layers 3 and 4, and allows the passage of gases and liquids to and from the outside. The boundaries between the individual layers are either of a slanted structure in which composition changes gradually or of a stepped structure in which composition changes abruptly. It should be noted that potential energy changes more continuously in the slanted structure than in the stepped structure. This permits electrons to move smoothly at the boundaries, allows oxidation-reduction reaction to proceed smoothly, and thereby enhances the regeneration efficiency of the intermediate and outer layers. Hence, the slanted structure is preferred for the individual boundaries.

The ceramic catalysts according to this invention are generally substantially spherical in shape. They may also be shaped substantially like columns.

However, columnar catalysts cannot maintain a three-layer structure comprising the core and the intermediate and outer layers at both ends thereof where all of them are exposed. By comparison, substantially spherical catalysts maintain a three-layer structure in all directions. Therefore, substantially spherical catalysts are preferable.

The ceramic catalysts according to this invention can be used with liquid fuels such as gasoline, light and heavy oils, and kerosene and gaseous fuels such as town gas and propane. The ceramic catalysts according to this invention are placed directly in fuels. For example, they are immersed in fuel tanks.

The core consists of a complex oxide ceramic of transition metals having an oxidation-reduction catalytic action that regenerates the outer and intermediate layers when their catalytic activity is lost by being contaminated by trace amounts of sulphur, lead and other inorganic substances contained in fuels. Electrons in the substance making up the core move to the intermediate and outer layers and reduce the substances making up the intermediate and outer layers that have been contaminated by catalyst-poisoning impurities. With the contaminated intermediate and outer layers thus detoxicated, their catalytic activities are regenerated.

A complex oxide ceramic of transition metals containing $MnO_2$, NiO, CoO and CuO is preferable for the core. Preferably, the core contains 40 to 70 parts of $MnO_2$, 10 to 20 parts each of NiO, CoO and CuO, all by weight. The four substances described above are essential. If any of them is absent or present in other ranges than those described above, a perovskite-type crystal structure having pores to store electrons contributing to the oxidation-reduction action is not formed and, as a consequence, the regenerating function decreases significantly. The catalysts according to this invention may contain other substances unless they have detrimental effects on the oxidation-reduction catalytic action.

The intermediate layer has a function to reform the incombustible and environment polluting substances contained in fuels to combustible substances. For example, benzene contained in gasoline is considered to be reformed to methane, propane or other combustible substances, with the benzene ring linkage severed and the hydrogen resulting from the decomposition of water by the catalytic action of the outer layer described later carrying out hydrogenation. Acetaldehyde is considered to be decomposed to methane, hydrogen and carbon dioxide by reacting with the hydrogen and oxygen ions resulting from the decomposition of water by the catalytic action of the outer layer.

The intermediate layer preferably consists of a silicate ceramic consisting essentially of alumina (i.e., alumina-based) and silicate, or, preferably, kaoline and carbon-bearing quartz. Preferably, the intermediate layer consists of 70 to 90 parts of $Al_2O_3$ and 10 to 30 parts of silicate or, preferably, 5 to 10 parts of kaoline and 5 to 20 parts of carbon-bearing quartz, all by weight. $Al_2O_3$ mainly functions as a carrier of silicate having a catalytic action. While a deficiency of $Al_2O_3$ leads to a lowering of mechanical strength, an excess decreases the quantity of silicate carried and impairs the catalytic action.

The outer layer has a function to activate the oxygen in the air contained in fuels and evolve hydrogen and nascent oxygen by decomposing the water contained in the fuel. Therefore, the combustible substances increased by reforming can be burnt without increasing the air supply from the outside.

The outer layer preferably consists of a ceramic containing noble metal alloys containing a fired mixture of Pt—Pd—Rh alloy and $Al_2O_3$, a Mo—$Al_2O_3$ catalyst, a $La_{0.5}$—$Sr_{0.5}CoO_3$ catalyst, and an $Al_2O_3$-carried vanadium oxide catalyst and/or a Ag—$Al_2O_3$ catalyst.

At least either one of the $Al_2O_3$-carried vanadium oxide catalyst and Ag—$Al_2O_3$ catalysts is required.

Preferably, the outer layer contains 15 to 25 parts each of the fired mixture of Pt—Pd—Rh alloy and $Al_2O_3$, Mo—$Al_2O_3$ catalyst, $La_{0.5}$—$Sr_{0.5}CoO_3$ catalyst, $Al_2O_3$-carried vanadium oxide catalyst and/or Ag—$Al_2O_3$ catalyst, all by weight. When the contents of the constituents are outside the ranges described above, the desired ceramic is difficult to form by firing, with a resulting decrease in the quantities of oxygen activated and water decomposed.

Preferably, the Pt—Pd—Rh alloy contains approximately 5 to 7:1 to 3:1 to 3 of Pt, Pd and Rh, by weight. The Pt—Pd—Rh alloy and $Al_2O_3$ are preferably mixed at a ratio of approximately 4 to 5:5 to 6. $Al_2O_3$ mainly functions as a carrier of Pt—Pd—Rh alloy having a catalytic action. While a deficiency of $Al_2O_3$ leads to a lowering of mechanical strength, an excess decreases the quantity of silicate carried and impairs the catalytic action. The fired mixture is prepared by firing a mixture of Pt—Pd—Rh alloy and $Al_2O_3$ at a temperature of approximately 850° to 930° C. The Mo—$Al_2O_3$ catalyst is a catalyst of Mo carried by $Al_2O_3$ at a ratio of approximately 1:1. The $La_{0.5}$—$Sr_{0.5}$—$CoO_3$ catalyst is a fired mixture of lanthanum oxide, strontium oxide and cobalt oxide. The $Al_2O_3$-carried vanadium oxide catalyst consists of approximately 9:1 of $Al_2O_3$ and vanadium oxide. The Ag—$Al_2O_3$ catalyst is a catalyst of Ag carried by $Al_2O_3$ at a ratio of approximately 1 Ag: 9 $Al_2O_3$.

As mentioned earlier, the method of manufacturing ceramic catalysts according to this invention comprises the steps of firing a core of a complex oxide ceramic of transition metal, coating an intermediate layer of an alumina-based silicate ceramic over the core, and coating an outer layer of a ceramic containing noble metals over the intermediate layer. Methods of manufacturing the preferable ceramic catalysts described above are given below.

Catalyst for the Core

A mixture of powders of $MnO_2$, NiO, CoO and CuO in a desired ratio, with the addition of a binder, is fired at a temperature between approximately 900° and 1000° C. and then the fired product is pulverized. The core catalyst is obtained by forming the pre-fired powder thus obtained into, for example, balls of 1.5 to 2.0 mm in diameter, with the addition of a binder, and sintered at a temperature of approximately 1150° to 1350° C. Sintering is performed in the air.

Catalyst for the Intermediate Layer

A mixture of powders of alumina and silicate such as kaoline and carbon-bearing quartz in a desired ratio, with the addition of a binder, is fired at a temperature between approximately 1050° and 1200° C. and then the fired product is pulverized. A paste of the pre-fired powder thus obtained is prepared by adding a binder and a foaming agent (which makes the sintered product porous by evolving carbon dioxide or other gases during sintering). The paste thus obtained is then coated over the core ball to a thickness of, for example, approximately 1 mm. Then, a catalyst prepared by coating the paste over the core ball is sintered at a temperature of approximately 900° to 1100° C. Sintering is performed in the air.

In sintering the intermediate layer catalyst at 900° to 1100° C., the substances making up the core and intermediate layer catalysts melt and diffuse with each other. Hence, the boundaries between the core and the intermediate layer assumes a slanted structure where composition changes gradually.

Catalyst for the Outer Layer

A mixture of powders of a fired mixture of Pt—Pd—Rh alloy and $Al_2O_3$, Mo—$Al_2O_3$ catalyst, $La_{0.5}$—$Sr_{0.5}CoO_3$ catalyst, and $Al_2O_3$-carried vanadium oxide catalyst and/or Ag—$Al_2O_3$ catalyst in a desired ratio is prepared. The mixture is made into a paste by adding a binder and a foaming agent. The paste is then coated over the fired catalyst ball consisting of the core and the intermediate layer to a thickness of, for example, approximately 1 mm. The ceramic catalyst according to this invention is obtained by firing the coated product at a temperature of approximately 600° to 700° C. in a reducing atmosphere. The fired mixture of Pt—Pd—Rh alloy and $Al_2O_3$ is prepared by mixing a Pt—Pd—Rh alloy and $Al_2O_3$ in a desired ratio and firing the mixture at a temperature of approximately 850° to 930° C.

In firing the outer layer catalyst at a temperature between 600° and 700° C., the substances making up the catalysts of the outer and intermediate layers melt and diffuse with each other. Hence, the boundaries between the core and the intermediate layer have a slanted structure where composition changes gradually.

If a stepped structure in which composition changes abruptly is desired, the intermediate layer catalyst mixed with wax or other viscous substance functioning as a binder is coated over the core catalyst, with the subsequent sintering process omitted. Likewise, the outer layer catalyst mixed with the same viscous substance is coated over the intermediate layer catalyst, with the subsequent sintering process omitted.

In the manufacturing process of the ceramic catalyst according to this invention, the core is formed into a substantially spherical shape during sintering, with the coatings applied subsequently to form the intermediate and outer layers forming substantially spherical crusts. Thus, the finished ceramic catalyst is substantially spherical in its entirety.

When sintering is performed in a cylindrical container, a substantially cylindrically shaped core is formed. Then, the coatings applied subsequently to form the intermediate and outer layers form substantially cylindrical crusts. Thus, the finished ceramic catalyst is substantially cylindrical in its entirety.

Embodiments

The following examples are given to illustrate specific details of the invention. The examples are only illustrative of this invention and not intended for the purpose of limitation.

The embodiments described below are substantially spherical in their entirety, with the boundaries between the individual catalyst layers being of the slated structure in which composition changes gradually.

Core Catalyst

To a mixture consisting of 54 g of $MnO_2$, 15 g of NiO, 15 g of CoO and 16 g of CuO, all in powder form, was added 58 ml of a 7 percent by weight aqueous solution of polyvinyl alcohol. The mixture thus obtained was fired at 950° C. and the fired product was pulverized. A paste prepared by adding 30 ml of a 7 percent by weight aqueous solution of polyvinyl alcohol to the pre-fired powder was formed into balls of approximately 2 mm in diameter. The core catalyst was obtained by sintering the balls at 1200° C.

Intermediate Layer Catalyst

To a mixture of 100 g consisting of 85 g of alumina, 5 g of kaoline and 10 g of carbon-bearing quartz was added 40 ml of a 7 percent by weight aqueous solution of polyvinyl alcohol. The mixture thus obtained was fired at 1150° C. and the fired product was pulverized. A paste was prepared by adding 30 ml of a 7 percent by weight aqueous solution of polyvinyl alcohol and 10 ml of a 12 percent by weight aqueous solution of calcium carbonate to the pre-fired powder. The paste thus obtained was coated over the ball-shaped core catalyst to a thickness of approximately 1 mm. By sintering the coated ball at 900° C., a catalyst consisting of the core coated with the intermediate layer was obtained.

Outer Layer Catalyst

A mixture consisting of equal amounts of a Pt—Pd—Rh alloy, which consists of Pt, Pd and Rh in a ratio of 3:1:1, and $Al_2O_3$ Was fired at approximately 900° C. Then, equal amounts of the fired mixture of the Pt—Pd—Rh alloy and $Al_2O_3$, a Mo—$Al_2O_3$ catalyst (consisting of Mo and $Al_2O_3$ in a ratio of 1:1), an $Al_2O_3$-carried vanadium oxide catalyst (consisting of $Al_2O_3$ and vanadium oxide in a ratio of 9:1), an Ag—$Al_2O_3$ catalyst (consisting of Ag and $Al_2O_3$ in a ratio of 1:9) and a $La_{0.5}$—$Sr_{0.5}CoO_3$ catalyst were mixed (weighing 100 g in total). A paste of the mixture was prepared by adding 30 ml of a 7 percent by weight aqueous solution of polyvinyl alcohol and 10 ml of a 12 percent by weight aqueous solution of calcium carbonate. The obtained paste was coated over the fired catalyst ball consisting of the core and intermediate layer to a thickness of approximately 1 mm. A three-layer ceramic catalyst was obtained by firing the coated ball at 670° C. in a carbon monoxide atmosphere.

The following tests were made using the ceramic catalyst thus obtained.

Reforming of Incombustible Substance to Combustible Substance

Figure 2:
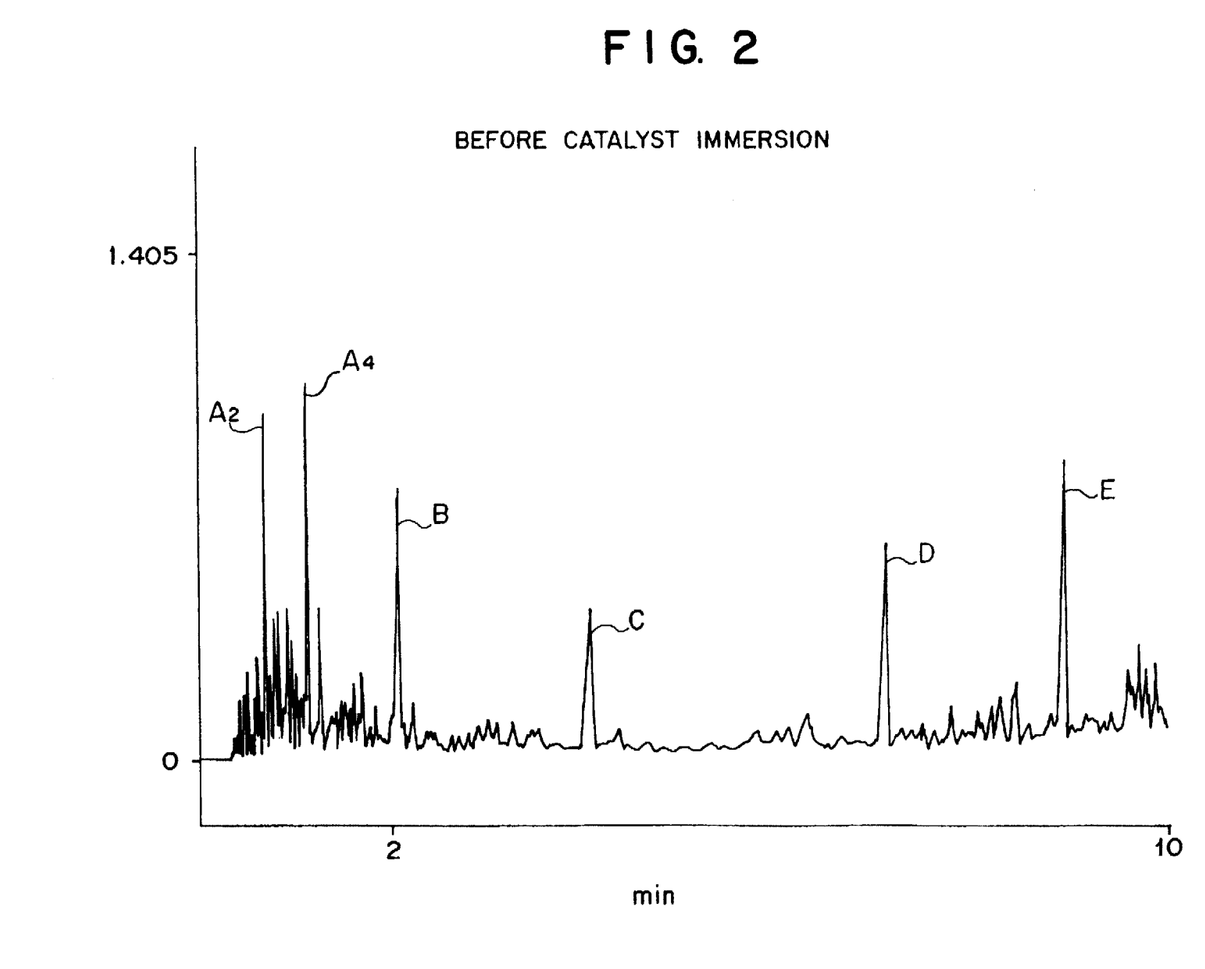
FIG. 2 is a chromatogram showing the composition of a light oil before a catalyst is immersed.
Figure 3:
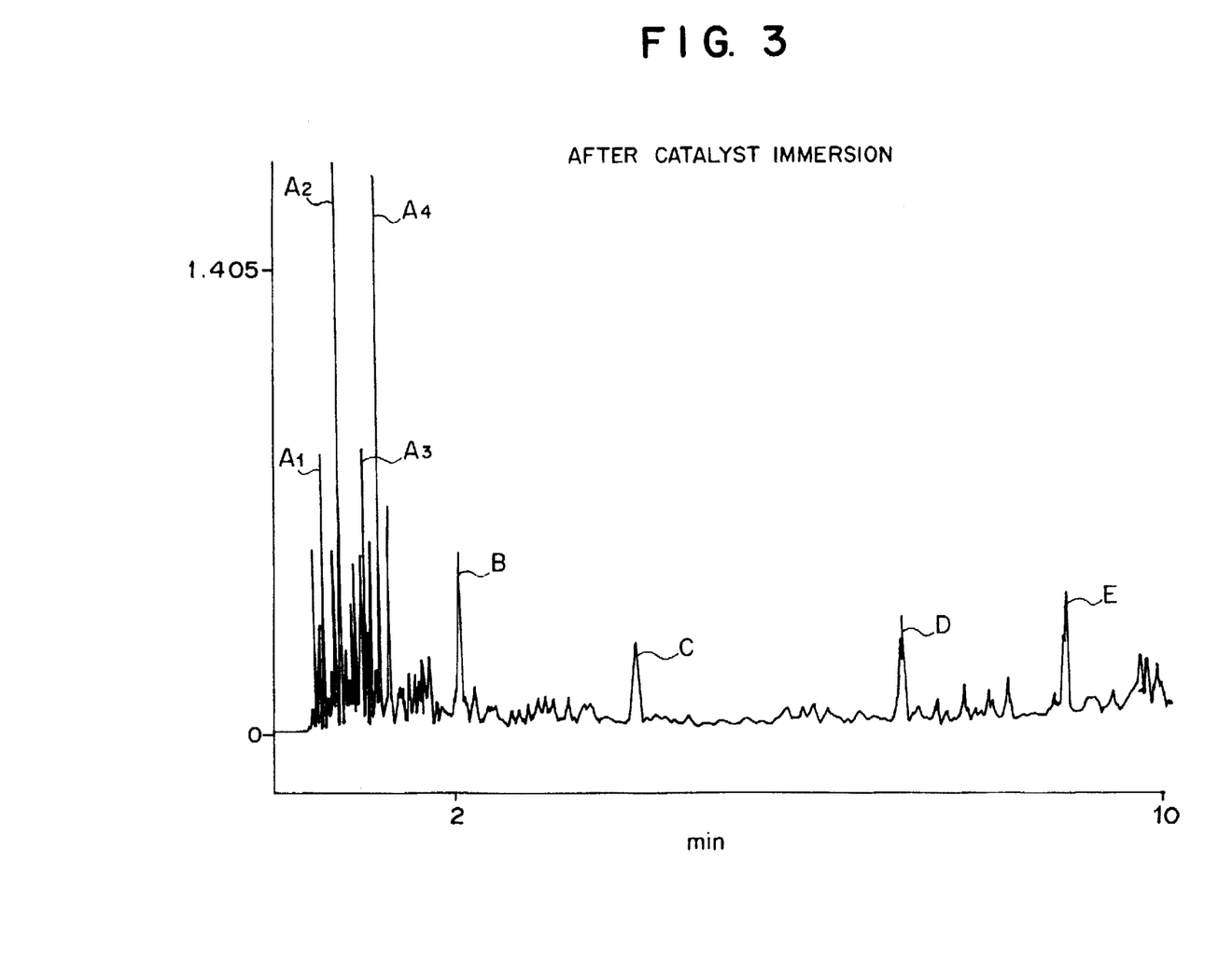
FIG. 3 is a chromatogram showing the composition of a light oil after a catalyst is immersed.

In 1 liter of light oil was immersed 130 mg of the catalyst balls prepared as described above. The light oil was allowed to stand for one hour at room temperature and gas-chromatographed. By using a Hewlett-Packard's 5290 series II chromatograph and an aluminum powder column, chromatography was carried out at 350° C. FIGS. 2 and 3 show chromatograms obtained before and after the immersion of the catalyst balls. In FIGS. 2 and 3, $A_1$ and $A_2$ denote methane-based combustible substances, $A_3$ ethane-, ethylene- and acetylene-based combustible substances, $A_4$ propane- and propylene-based combustible substances, B pentane, C butane, D methylpentene, and E benzene. As is obvious from the chromatograms, incombustible substances, such as methylpentene and benzene, decrease and combustible substances increase after immersion of the catalyst according to this invention.

Activation of Oxygen Dissolved in Fuel

Figure 4:
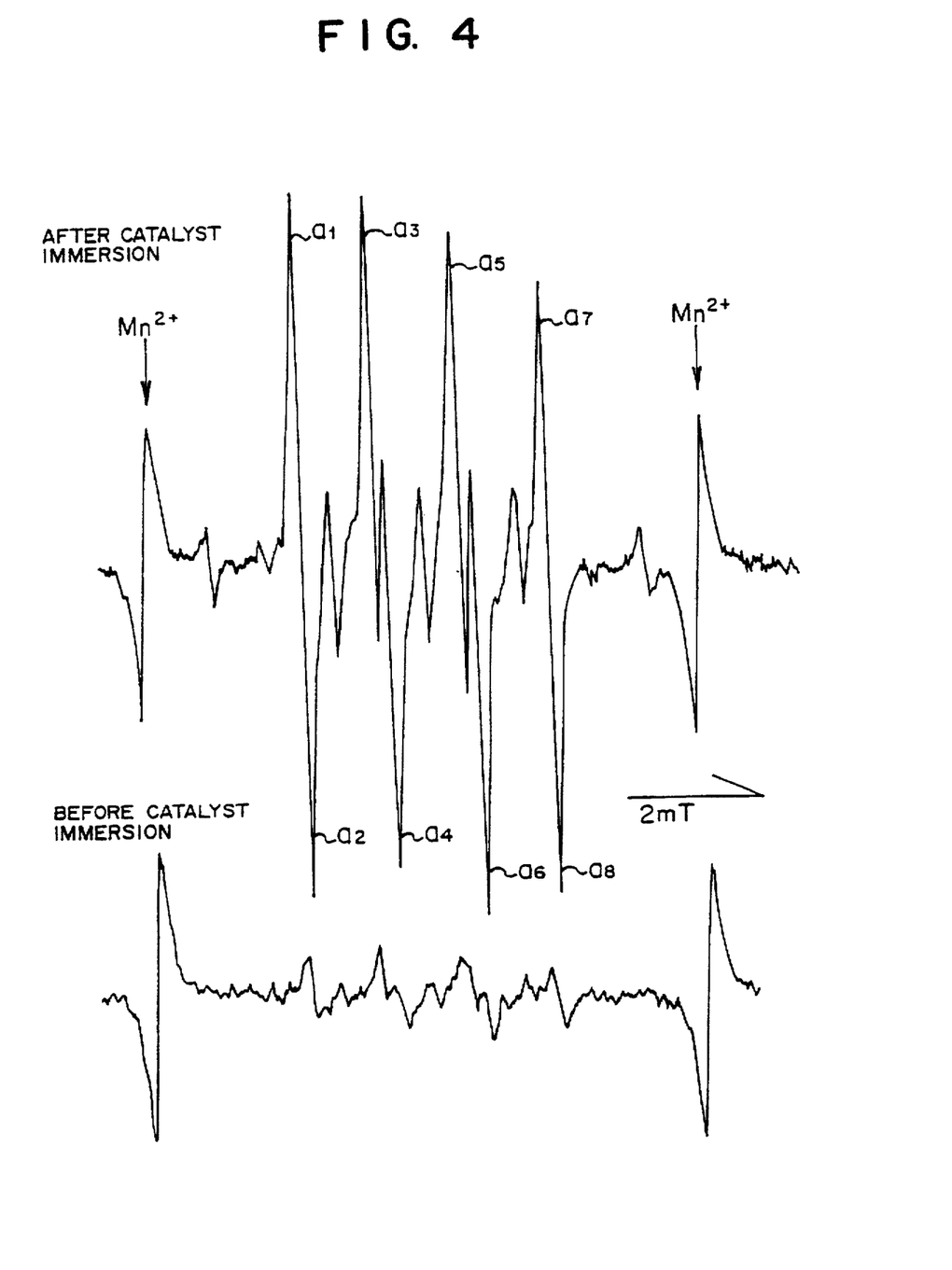
FIG. 4 is an electron spin resonance spectrum showing the formation of oxygen radicals in fuel.

In 1 liter of gasoline was immersed 130 mg of the catalyst balls prepared as described above. Production of oxygen radicals in the gasoline that was allowed to stand at room temperature for one hour was confirmed by electron spin resonance (ESR) spectrum (FIG. 4). $a_1$ to $a_8$ designate oxygen radicals.

Decrease of Aldehyde Concentration in Exhaust Gas

Figure 5:
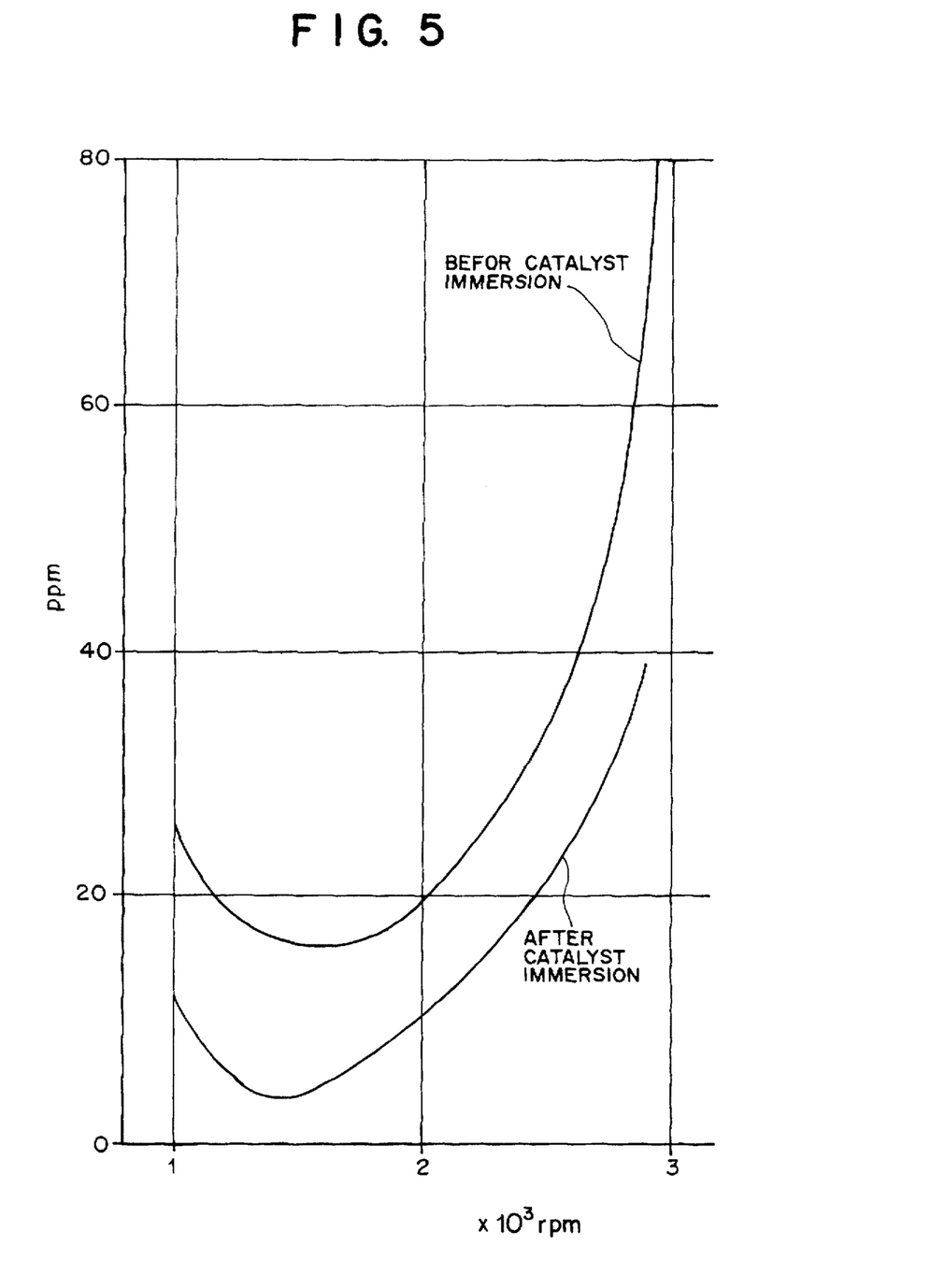
FIG. 5 graphically shows the relationship between the rotating speed of the automotive engine and the total aldehyde concentration in the exhaust gas.

By immersing approximately 8 g of the catalyst prepared as described above in the fuel tank (having a capacity of 60 liters) of automobiles equipped with a 1200 cc gasoline engine, the relationship between the rotating speed of the engine and the total aldehyde concentration in the exhaust gas was determined. The concentration was determined by measuring the absorption spectrum obtained by spectrum analysis (by using an infrared-ray spectroscope FTIR-2 manufactured by Shimazu Corp.). FIG. 5 shows the results obtained with and without the immersion of the catalyst (averaged over six automobiles). As can be seen in FIG. 5, immersion of the catalyst significantly decreased the total aldehyde concentration irrespective of the engine speed.

Decrease of NOx Concentration in Exhaust Gas

Figure 6:
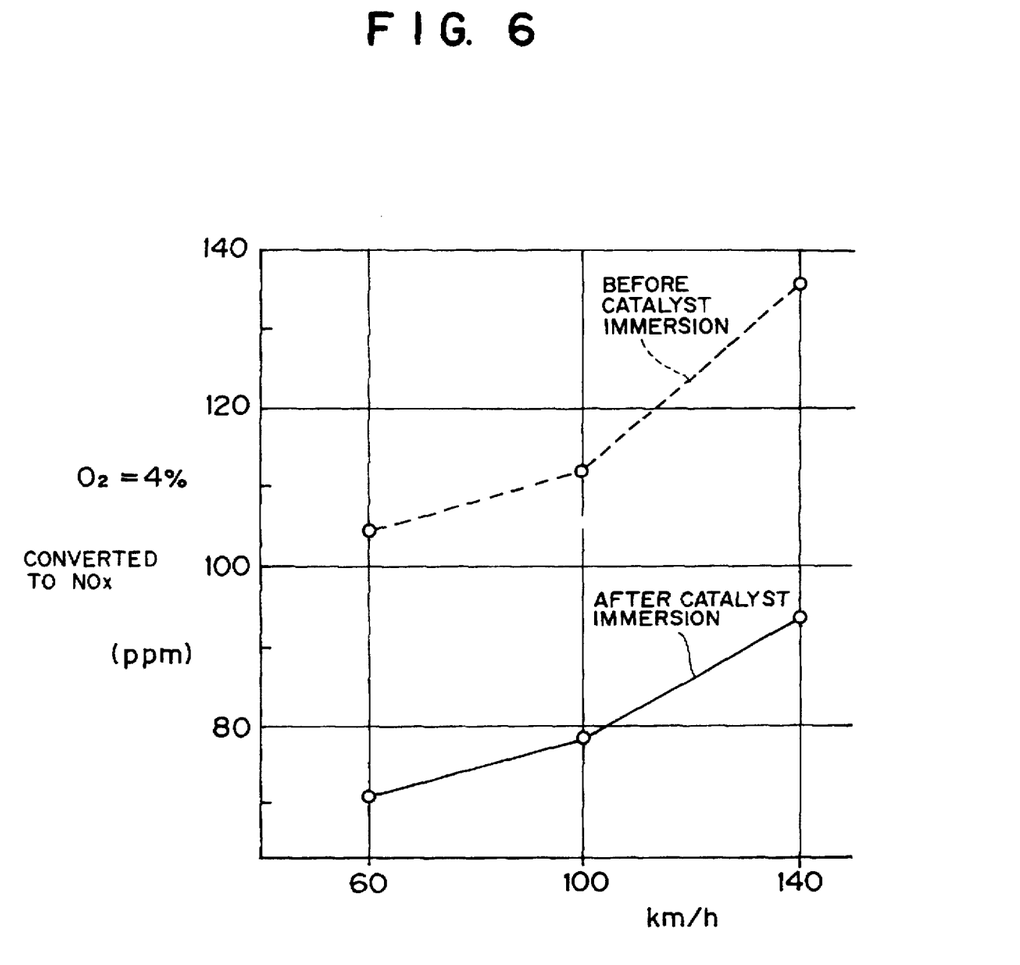
FIG. 6 graphically shows the relationship between the running speed of the automobile and the NOx concentration in the exhaust gas.

By immersing approximately 8 g of the catalyst prepared as described above in the fuel tank (having a capacity of 60 liters) of automobiles equipped with a 1200 cc gasoline engine, the relationship between the running speed of the automobile and the NOx concentration in the exhaust gas was determined. The concentration was determined by gas chromatography. FIG. 6 shows the results obtained with and without the immersion of the catalyst. As can be seen in FIG. 6, immersion of the catalyst significantly (by approximately 29 to 33 percent) decreased the NOx concentration in the exhaust gas irrespective of the running speed. The thermal decomposition temperature (ignition point) measured by differential thermal analysis dropped by approximately 7° C.

from 278° C. before the immersion of the catalyst to 271° C. after the immersion. This temperature drop is considered to suppress the evolution of NOx.

Figure 7:
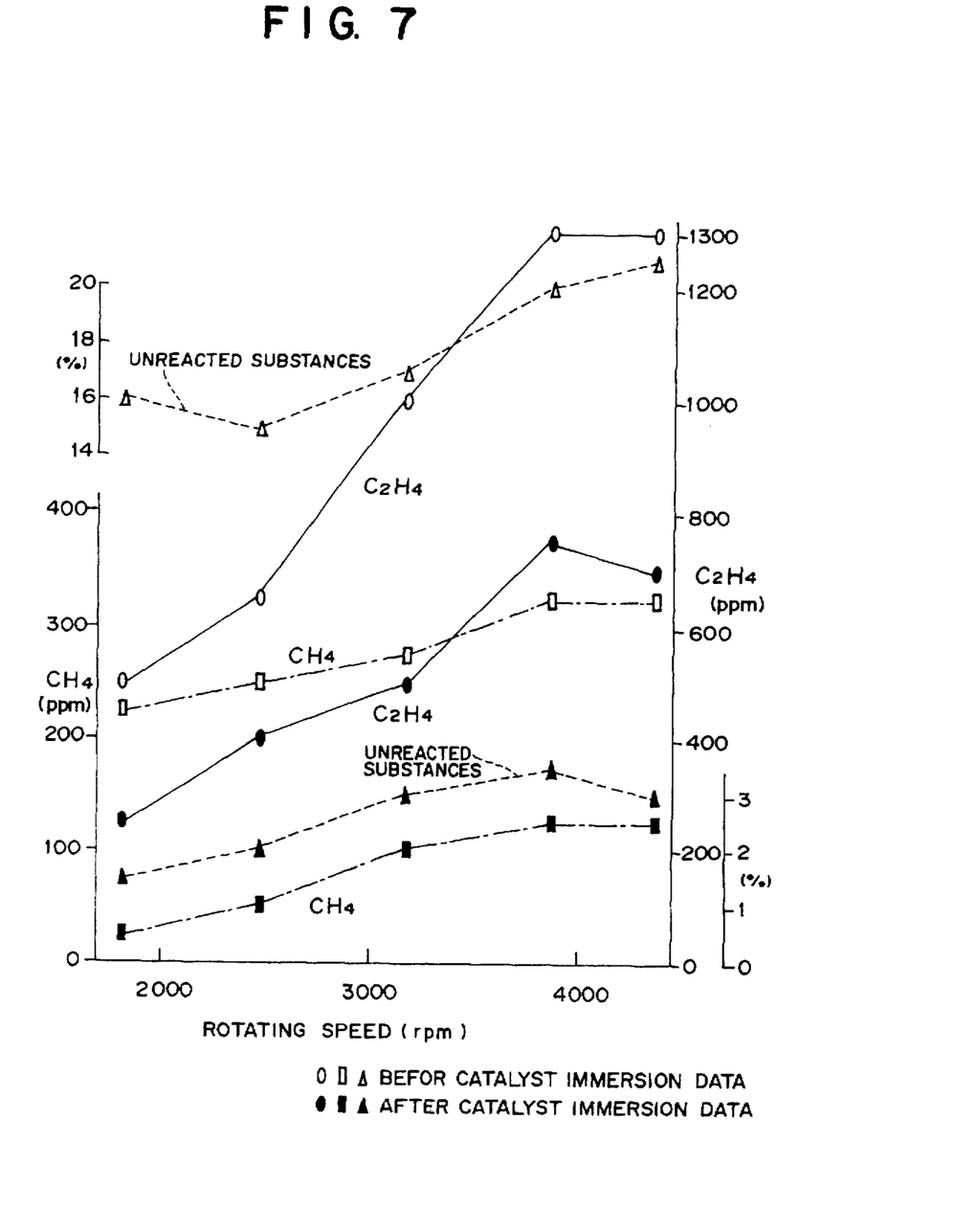
FIG. 7 graphically shows the relationship between the composition of the combustion gas in the engine cylinder and the rotating speed.

Composition of Combustion Gases in the Cylinders By immersing approximately 8 g of the catalyst prepared as described above in the fuel tank (having a capacity of 60 liters) of automobiles equipped with a 1200 cc gasoline engine, the composition of combustion gases in the engine cylinders was determined by gas chromatography. Five milliliters of gases discharged when the pistons returned to the original position after ignition and explosion in the cylinders were sampled as specimens. As can be seen in FIG. 7 that shows the obtained results, the unreacted substances significantly decreased from approximately 15 to 21 percent before the immersion of the catalyst to approximately 1.5 to 3.5 percent after the immersion. The concentrations of methane and ethylene also decreased greatly after the immersion of the catalyst.

Relationship between Catalyst and Octane Number

Figure 8:
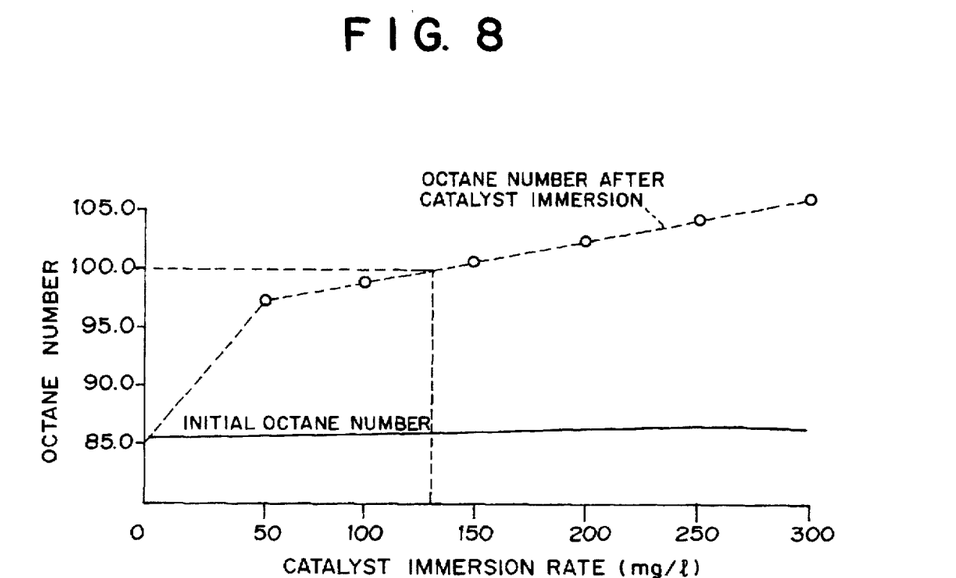
FIG. 8 graphically shows the relationship between the quantity of catalyst used and the octane number.

Changes in octane number were determined by immersing different quantities of the catalyst prepared as described earlier in regular gasoline whose initial octane number was approximately 86 before the immersion. As shown in FIG. 8, the immersion of the catalyst significantly increased octane number. Octane number increased substantially linearly with an increase in the quantity of the catalyst immersed (mg per liter).

Relationship with Combustion Efficiency

Figure 9:
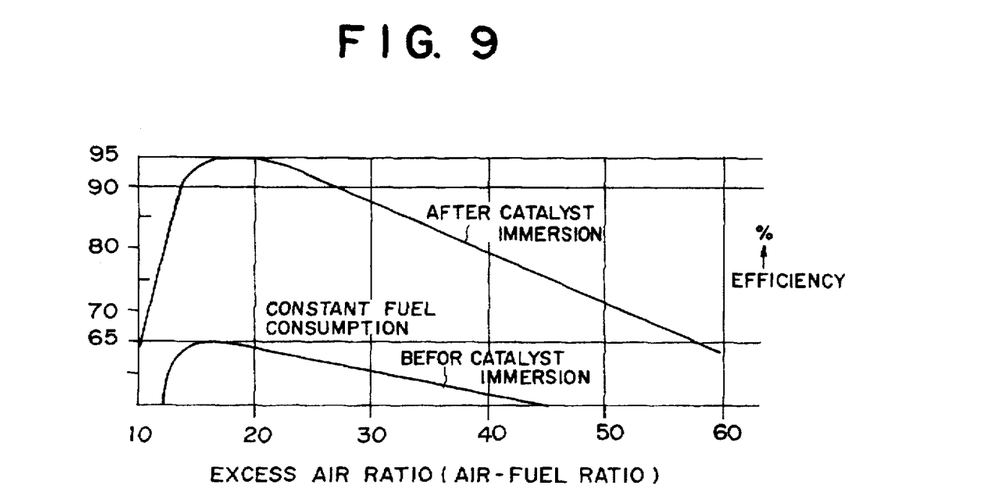
FIG. 9 graphically shows the relationship between the air-fuel ratio and combustion efficiency.

Combustion efficiencies of gasoline engines before and after immersing the catalyst in regular gasoline at a rate of 130 mg per liter were determined. FIG. 9 shows the combustion efficiencies before and after the immersion of the catalyst in regular gasoline. The measurements were taken under the conditions where constant fuel consumption was maintained. As can be seen in FIG. 9, the catalyst immersion increased combustion efficiency by approximately 30 percent when the air-fuel ratio was 16.7.

As discussed above, the ceramic catalysts according to this invention enhance fuel economy and decrease noxious substances in exhaust gases by reforming the incombustible and environment-polluting substances in fuels to combustible substances, activating the oxygen contained in fuels, and evolving nascent oxygen by decomposing the water contained in fuels.

What is claimed is:

1. A fluid fuel reforming ceramic catalyst comprising a core of a complex oxide ceramic of transition metals, an intermediate layer of a ceramic containing alumina and silicate in which the main element is alumina covering the core, and an outer layer of a ceramic containing a noble metal alloy that covers the intermediate layer.

2. A fluid fuel reforming ceramic catalyst according to claim 1, in which the core consists essentially of complex oxides of transition metals comprising $MnO_2$, Nio, CoO and CuO, the intermediate layer consists essentially of a ceramic comprised of a mixture of alumina and silicate in which the main element is alumina, and the outer layer consists essentially of a ceramic containing a noble metal alloy comprising a fired mixture of a Pt—Pd—Rh alloy and $Al_2O_3$, a Mo—$Al_2O_3$ catalyst, a $La_{0.5}$—$Sr_{0.5}CoO_3$ catalyst, and an $Al_2O_3$-carried vanadium oxide catalyst and/or a Ag—$Al_2O_3$ catalyst.

3. A fluid fuel reforming ceramic catalyst according to claim 2, in which the core consists of 40 to 70 parts by weight of $MnO_2$ and 10 to 20 parts by weight each of NiO, CoO and CuO, the intermediate layer consists of 70 to 90 parts by weight of alumina and 10 to 30 parts by weight of silicate, and the outer layer consists of 15 to 25 parts by weight of a fired mixture of a Pt—Pd—Rh alloy and $Al_2O_3$ and 15 to 25 parts by weight each of a Mo—$Al_2O_3$ catalyst, a $La_{0.5}$—$Sr_{0.5}CoO_3$ catalyst, and an $Al_2O_3$-carried vanadium oxide catalyst and/or a Ag—$Al_2O_3$ catalyst.

4. A fluid fuel reforming ceramic catalyst according to claim 1, in which the boundaries between the core and intermediate layer and between the intermediate and outer layers have a slanted structure in which the composition of ceramics changes gradually.

5. A fluid fuel reforming ceramic catalyst according to claim 1, in which the boundaries between the core and intermediate layer and between the intermediate and outer layers have a stepped structure in which the composition of ceramics changes abruptly.

6. A fluid fuel reforming ceramic catalyst according to claim 1, in which the core is substantially spherical and the intermediate and outer layers are shaped like substantially spherical crusts.

7. A fluid fuel reforming ceramic catalyst according to claim 1, in which the core is substantially columnar and the intermediate and outer layers are substantially cylindrical.

8. A fluid reforming ceramic catalyst according to claim 1, in which the intermediate layer further contains kaoline or carbon-bearing quartz.

9. A method of manufacturing fluid fuel reforming ceramic catalysts comprising the steps of forming a core by firing a complex oxide ceramic of transition metals, coating an intermediate layer of a ceramic containing alumina and silicate in which the main element is alumina over the core, and coating an outer layer of ceramics containing noble metals over the intermediate layer.

10. A method of manufacturing fluid fuel reforming ceramic catalysts according to claim 9, in which the intermediate and outer layers mixed with viscous substances are coated without sintering and the boundaries between the core and intermediate layer and between the intermediate and outer layers are made to have a stepped structure in which the composition of the ceramics change abruptly.

11. A method of manufacturing fluid fuel reforming ceramic catalysts according to claim 9, in which the core of a complex oxide ceramic of transition metals is formed by mixing $MnO_2$, NiO, CoO and CuO with a binder, firing the mixture at 900° to 1000° C., pulverizing the fired product, and sintering the pulverized product with a binder at 1150° to 1350° C., the intermediate layer is formed by mixing alumina and silicate with a binder, firing the mixture at 1050° to 1200 C., pulverizing the fired product, making the pulverized product into a paste by adding a binder and a foaming agent, coating the paste over the core and sintering the coated layer at 900° to 1100° C., and the outer layer containing noble metals is formed by mixing a fired mixture of a Pt—Pd—Rh alloy and $Al_2O_3$, a Mo—$Al_2O_3$ catalyst, a $La_{0.5}$—$Sr_{0.5}$—$CoO_3$ catalyst, and at least one of an $Al_2O_3$-carried vanadium oxide catalyst and a Ag—$Al_2O_3$ catalyst, making the mixture into a paste by adding a binder and a foaming agent, coating the paste over the intermediate layer, and firing the coated layer at 600° to 700° C. in a reducing atmosphere.

12. A method of manufacturing fluid fuel reforming ceramic catalysts according to claim 9, in which the core consists of 40 to 70 parts by weight of $MnO_2$ and 10 to 20 parts by weight each of NiO, CoO and CuO, the intermediate layer consists of 70 to 90 parts by weight of alumina and 10 to 30 parts by weight of silicate, and the outer layer consists of 15 to 25 parts by weight each of a fired mixture of a Pt—Pd—Rh alloy and $Al_2O_3$, a Mo—$Al_2O_3$ catalyst, a $La_{0.5}$—$Sr_{0.5}$—$CoO_3$ catalyst, and an $Al_2O_3$-carried vanadium oxide catalyst and/or a Ag—$Al_2O_3$ catalyst.

13. A method of manufacturing fluid fuel reforming ceramic catalysts comprising the steps of coating an intermediate layer of a ceramic containing alumina and silicate in which the main element is alumina over a core of a complete oxide ceramic of transition metals and an outer layer of a ceramic containing noble metals over the intermediate layer.

* * * * *